US008909390B2

(12) United States Patent
Tonegawa et al.

(10) Patent No.: US 8,909,390 B2
(45) Date of Patent: Dec. 9, 2014

(54) PRELIMINARY AIR CONDITIONING SYSTEM

(75) Inventors: Hiromi Tonegawa, Kounan (JP); Katsutoshi Murawaka, Kasugai (JP); Tetsuhiro Ishikawa, Miyoshi (JP); Shinji Ichikawa, Toyota (JP); Daisuke Ishii, Toyota (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 13/499,849

(22) PCT Filed: Jun. 29, 2011

(86) PCT No.: PCT/IB2011/001523
§ 371 (c)(1),
(2), (4) Date: Apr. 2, 2012

(87) PCT Pub. No.: WO2012/001497
PCT Pub. Date: Jan. 5, 2012

(65) Prior Publication Data
US 2013/0096734 A1    Apr. 18, 2013

(30) Foreign Application Priority Data
Jul. 1, 2010 (JP) .................... 2010-151008

(51) Int. Cl.
*B60H 1/00* (2006.01)
*B60H 1/22* (2006.01)

(52) U.S. Cl.
CPC .... *B60H 1/00735* (2013.01); *B60H 2001/2234* (2013.01); *B60H 1/00257* (2013.01); *B60H 1/00642* (2013.01); *B60H 2001/2262* (2013.01); *B60H 1/00657* (2013.01)

USPC ........ 701/2; 165/202; 237/2; 705/14; 62/157

(58) Field of Classification Search
CPC .......... G05D 23/10; G07C 5/008; F24F 7/00; G06Q 30/00
USPC ........ 701/2; 237/2; 165/202; 705/14; 62/157
See application file for complete search history.

(56) References Cited

U.S. PATENT DOCUMENTS 5,285,963 A    2/1994  Wakefield et al.
7,737,828 B2 *  6/2010  Yang et al. ................. 340/407.1

(Continued)

FOREIGN PATENT DOCUMENTS

EP    2 163 413 A1    3/2010
EP    2 284 026 A1    2/2011

(Continued)

OTHER PUBLICATIONS

Oct. 14, 2011 International Search Report issued in International Patent Application No. PCT/IB2011/001523.

(Continued)

*Primary Examiner* — Helal A Algahaim
*Assistant Examiner* — Michael Fouche
(74) *Attorney, Agent, or Firm* — Oliff PLC

(57) ABSTRACT

A charging start time and preliminary air conditioning time are calculated based on the departure time that is set with a control/operation device (S108), and the charging time and preliminary air conditioning time are set (S110). Then, a control is executed to start charging when at the charging start time (S112 to 116) and preliminary air conditioning may be started when the amount of charge is sufficient for preliminary air conditioning and a preliminary air conditioning starting trigger is detected, that is locking or preparation for leaving house is detected, for example (S118 to 128).

11 Claims, 3 Drawing Sheets

(56) References Cited

U.S. PATENT DOCUMENTS

| | | | |
|---|---|---|---|
| 2007/0144723 A1 | 6/2007 | Aubertin et al. | |
| 2009/0024267 A1* | 1/2009 | Kawai | 701/22 |
| 2009/0144149 A1* | 6/2009 | Sakakibara et al. | 705/14 |
| 2010/0132388 A1* | 6/2010 | Oyobe et al. | 62/157 |
| 2010/0204865 A1* | 8/2010 | Nakamura | 701/22 |

FOREIGN PATENT DOCUMENTS

| | | |
|---|---|---|
| JP | A-07-193901 | 7/1995 |
| JP | A-07-232545 | 9/1995 |
| JP | A-08-230441 | 9/1996 |
| JP | A-09-109648 | 4/1997 |
| JP | A-2009-089474 | 4/2009 |
| JP | A-2009-134450 | 6/2009 |
| JP | A-2009-136109 | 6/2009 |

OTHER PUBLICATIONS

Oct. 14, 2011 Written Opinion of the International Searching Authority issued in International Patent Application No. PCT/IB2011/001523.

* cited by examiner

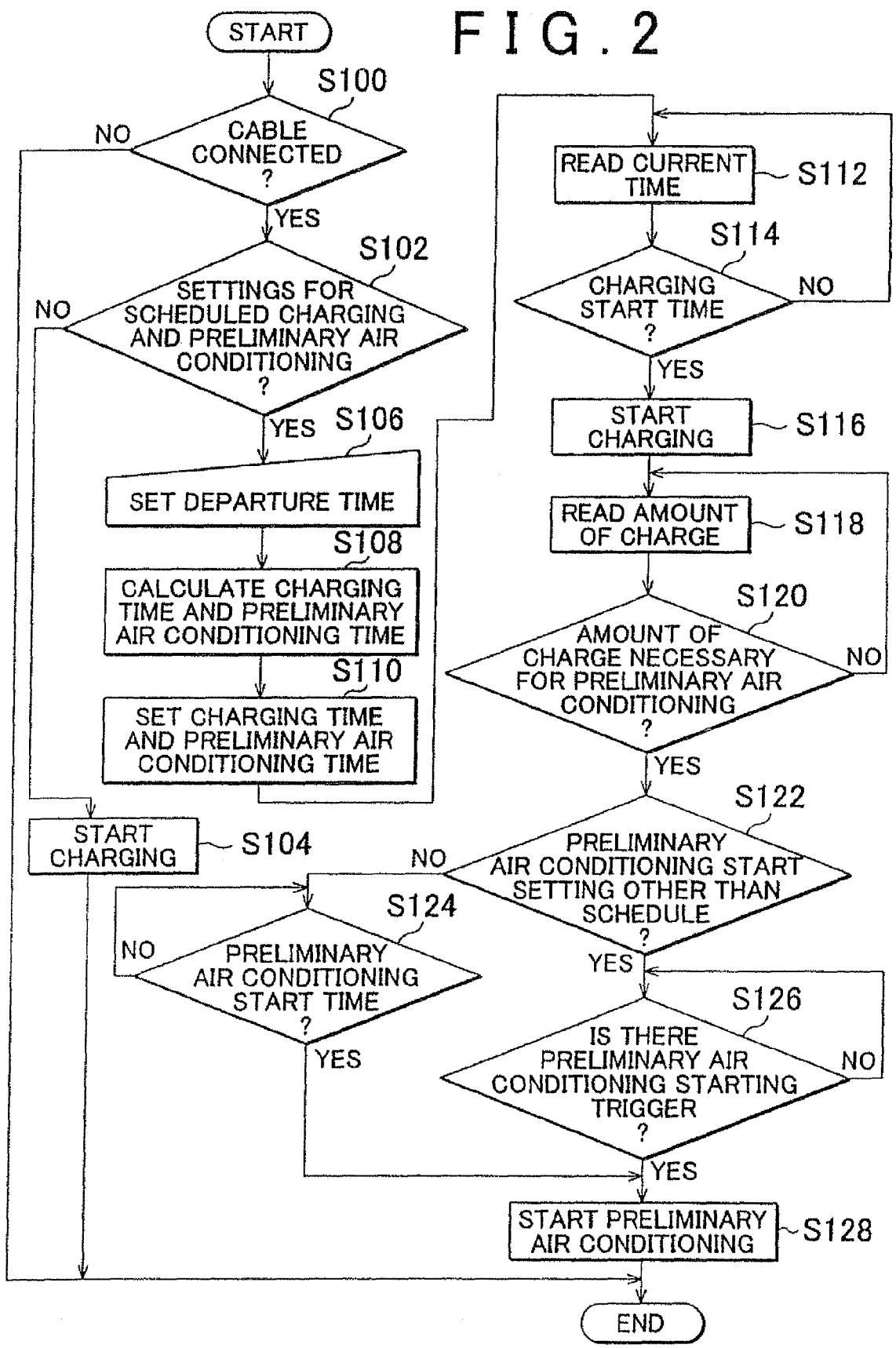

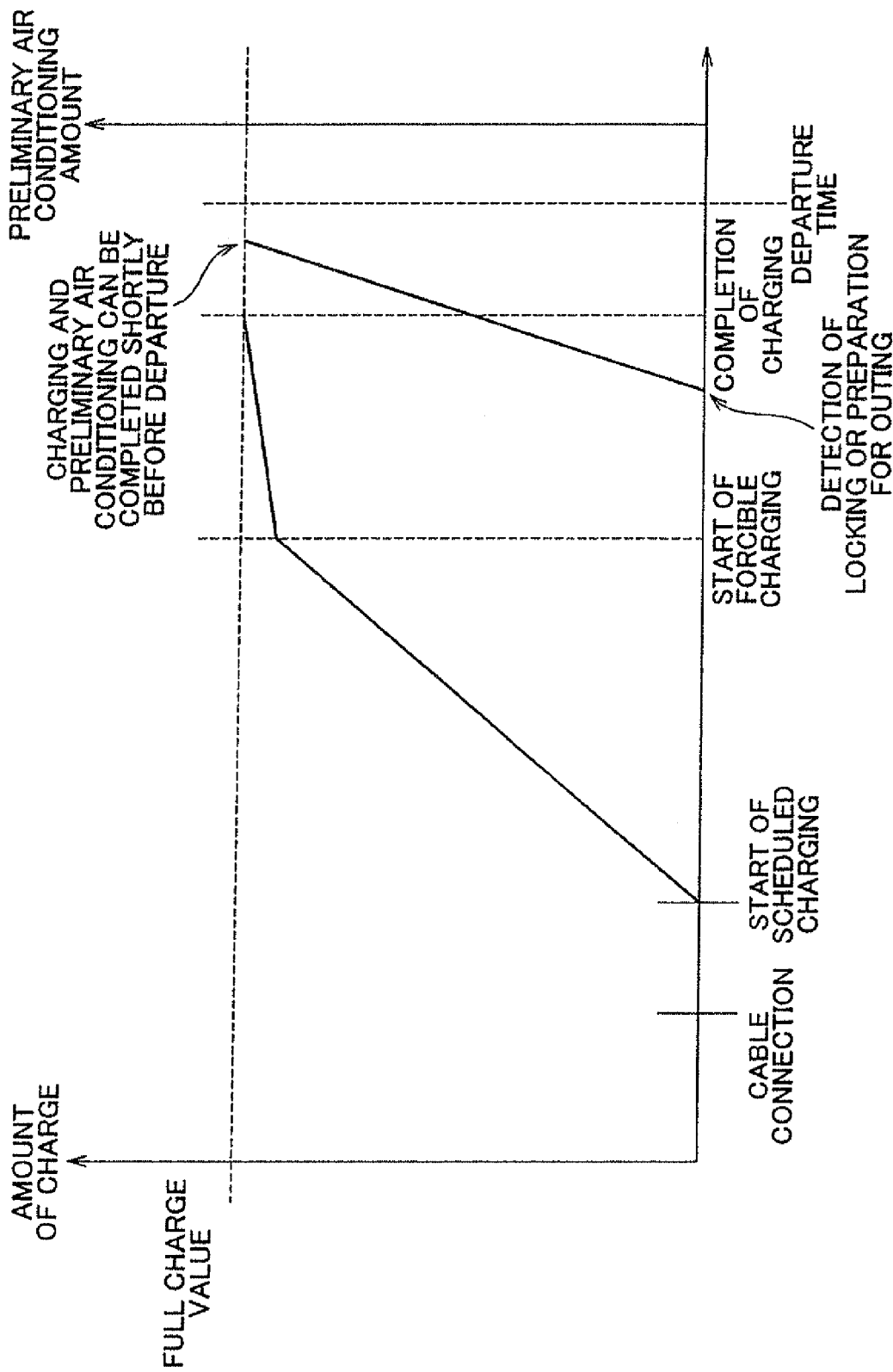

PRELIMINARY AIR CONDITIONING SYSTEM

The disclosure of Japanese Patent Application No. 2010-151008 filed on Jul. 1, 2010, including the specification, drawings and abstract, is incorporated herein by reference in its entirety.

BACKGROUND OF THE INVENTION

1. Field of the Invention

The present invention relates to a preliminary air conditioning system, and more particularly to a preliminary air conditioning system that charges a battery mounted in a motor vehicle with electric power that is supplied from a building and adjusts the temperature in the cabin of the motor vehicle before a passenger enters the motor vehicle.

2. Description of Related Art

In general, motor vehicles are equipped with a vehicle air conditioner that controls the temperature in the cabin to maintain the cabin in a comfortable air-conditioned state. Also, a vehicle air conditioner has been proposed which performs what is called preliminary air conditioning, i.e., controls the temperature in the cabin in a preset operation mode according to commands from a remote control or a timer setting before the passenger enters the motor vehicle.

In addition, hybrid vehicles that have a battery and are driven by an engine and a motor are becoming increasingly popular for reducing $CO_2$ emissions which contribute to global warming. Likewise, electric vehicles powered by batteries also start to attract attention. Technology for charging the batteries mounted on such motor vehicles using electricity from houses has been proposed.

For example, Japanese Patent Application Publication No. 2009-134450 (JP-A-2009-134450) describes detecting the state of charge (SOC) of batteries when a plurality of vehicles are coupled to an external power source and determining estimated power consumption of each vehicle; calculating the necessary charging power for each vehicle based on the detected SOC and the estimated power consumption; detecting the time of start of use of each vehicle; and determining a charging schedule about the charging time and charging power for each vehicle based on the necessary amount of charge and the time of start of use to control the charging. The technology described in JP-A-2009-134450 relies on a timer to start preliminary air conditioning with a timer or the like to perform preliminary air conditioning before a passenger enters the vehicle at the planned time.

However, because the technology that is disclosed in JP-A-2009-134450 relies on a timer to start preliminary air conditioning, it is possible that preliminary air conditioning cannot be carried out appropriately if the motor vehicle is not used on schedule. Therefore, it still has room for improvement.

SUMMARY OF THE INVENTION

The present invention has been made in view of the above facts, and provides a preliminary air conditioning system that can reliably perform preliminary air conditioning before riding.

According one aspect of the present invention, a preliminary air conditioning system is provided which includes: a communication device that communicates with a motor vehicle that is equipped with an air conditioner that has a preliminary air conditioning function of controlling the temperature in the cabin of the motor vehicle before the motor vehicle is driven and a battery that stores electric power for use in driving the vehicle; a charger that determines the state of charge of the battery based on the communication by the communication device and supplies electric power that is necessary to charge the battery to the motor vehicle from a building to charge the battery; a detector that detects locking or a preparation for locking of a door of the building; and a controller that is configured to control the air conditioner to activate the preliminary air conditioning function using the communication by the communication device based on the result of detection by the detector when the communication device indicates that the detector has detected the locking or preparation for locking.

According to the preliminary air conditioning system described above, the communication device communicates with the motor vehicle. The motor vehicle is equipped with an air conditioner that has a preliminary air conditioning function of controlling the temperature in the cabin of the motor vehicle before the motor vehicle is driven and a battery that stores electric power for use in driving the vehicle. As the motor vehicle, an electric vehicle or hybrid vehicle can be adopted, for example.

The charger obtains the amount of charge in the battery based on the communication by the communication device and supplies electric power to the motor vehicle from the building to charge the battery. For example, a charger can be used which obtains a charging schedule based on the amount of charge in the battery that is acquired on the building side through the communication device and predetermined date and time when the motor vehicle is going to be used and exercises control so that charging of the battery can be completed before departure.

The detector detects locking or a preparation for locking of a door, such as the front door, of the building. That is, it can be determined that the resident is going to use the motor vehicle when the detector detects the locking or preparation for locking of a door, such as the front door.

The controller controls the air conditioner to activate the preliminary air conditioning function using the communication by the communication device based on the result of detection by the detector when the locking or preparation for locking is detected. Because the preliminary air conditioning function can be activated when leaving house or a preparation for leaving house by the resident is detected, preliminary air conditioning can be reliably carried out before the motor vehicle is driven even when the motor vehicle is not used on schedule.

The preliminary air conditioning system may further include a setting device that is provided in the building and that is operated by a user to set a schedule for activating the preliminary air conditioning function and selectively sets a trigger to activate the preliminary air conditioning function based on the activation schedule or on the result of detection by the detector, and the controller may further control the air conditioner to activate the preliminary air conditioning function based on the trigger that is set by the setting device. In other words, the controller may be configured to start preliminary air conditioning not only in response to the locking or preparation for locking but also according to a schedule that is set by the setting device.

In the preliminary air conditioning system, the controller may further control the air conditioner to make it function as a cooler if the ambient air temperature that is detected by a temperature detector that is provided in the motor vehicle or the building to detect the ambient air temperature exceeds a first prescribed temperature and to make it function as a heater if the ambient air temperature that is detected by the temperature detector is below a second prescribed temperature. That is, the air conditioner is automatically switched between cooling and heating modes depending on the ambient air temperature so that the air in the vehicle cabin can be adjusted to a comfortable temperature when the preliminary air conditioning function is activated.

The preliminary air conditioning system may further include an energization detector that detects energization of a kitchen appliance in the building, and the controller may further control the air conditioner to activate the preliminary air conditioning function based on the result of detection by the energization detector when the energization is detected. It is considered that energization of the kitchen appliance occurs when breakfast is prepared, for example. Thus, preliminary air conditioning can be also carried out reliably before the motor vehicle is driven by detecting the preparation of breakfast based on energization of a kitchen appliance and activating the preliminary air conditioning function a predetermined period of time after the detection of the energization.

The preliminary air conditioning system may further include a leaving house preparation detector that detects a preparation for leaving house by a resident of the building, and the controller may further control the air conditioner to activate the preliminary air conditioning function if the leaving house preparation detector detects the preparation for leaving house.

Here, the leaving house preparation detector may determine that a preparation for leaving house is detected when a prescribed period of time has passed after energization of an IH heater is detected. Alternatively, the leaving house preparation detector may determine that a preparation for leaving house is detected when a prescribed period of time has passed after an air conditioner in the building is switched off. Alternatively, the leaving house preparation detector may determine that a preparation for leaving house is detected when a prescribed period of time has passed after an illumination lamp in the building is switched off. Alternatively, the leaving house preparation detector may determine that a preparation for leaving house is detected when a cable used to charge the battery is pulled out.

In the preliminary air conditioning system, it is preferred that the setting device should set predetermined priorities to a plurality of triggers and the controller should activate the preliminary air conditioning function of the air conditioner according to the priorities of the triggers. When priorities are preliminarily determined for a plurality of triggers as described above, an appropriate trigger can be used and the controller can control the air conditioner to activate the preliminary air conditioning function at an appropriate time.

In the preliminary air conditioning system, the controller may inhibit the activation of the preliminary air conditioning function before the amount of charge in the battery reaches a prescribed value. In other words, the controller may control the air conditioner so that the preliminary air conditioning function can be activated after the amount of charge in the battery has reached a prescribed value.

As described in the foregoing, the effect of the present invention is that preliminary air conditioning can be reliably carried out before the motor vehicle is driven by controlling the activation of the preliminary air conditioning function based on the result of detection of locking or a preparation for locking of a building.

BRIEF DESCRIPTION OF THE DRAWINGS

Features, advantages, and technical and industrial significance of example embodiments of the invention will be described below with reference to the accompanying drawings, in which like numerals denote like elements, and wherein:

FIG. 2 is a flowchart that shows the flow of processing that is performed in the preliminary air conditioning system according to the embodiment of the present invention; and FIG. 3 is a view that explains the timings of battery charging and preliminary air conditioning that are carried out in the preliminary air conditioning system according to the embodiment of the present invention.

DETAILED DESCRIPTION OF EMBODIMENTS

Figure 1:
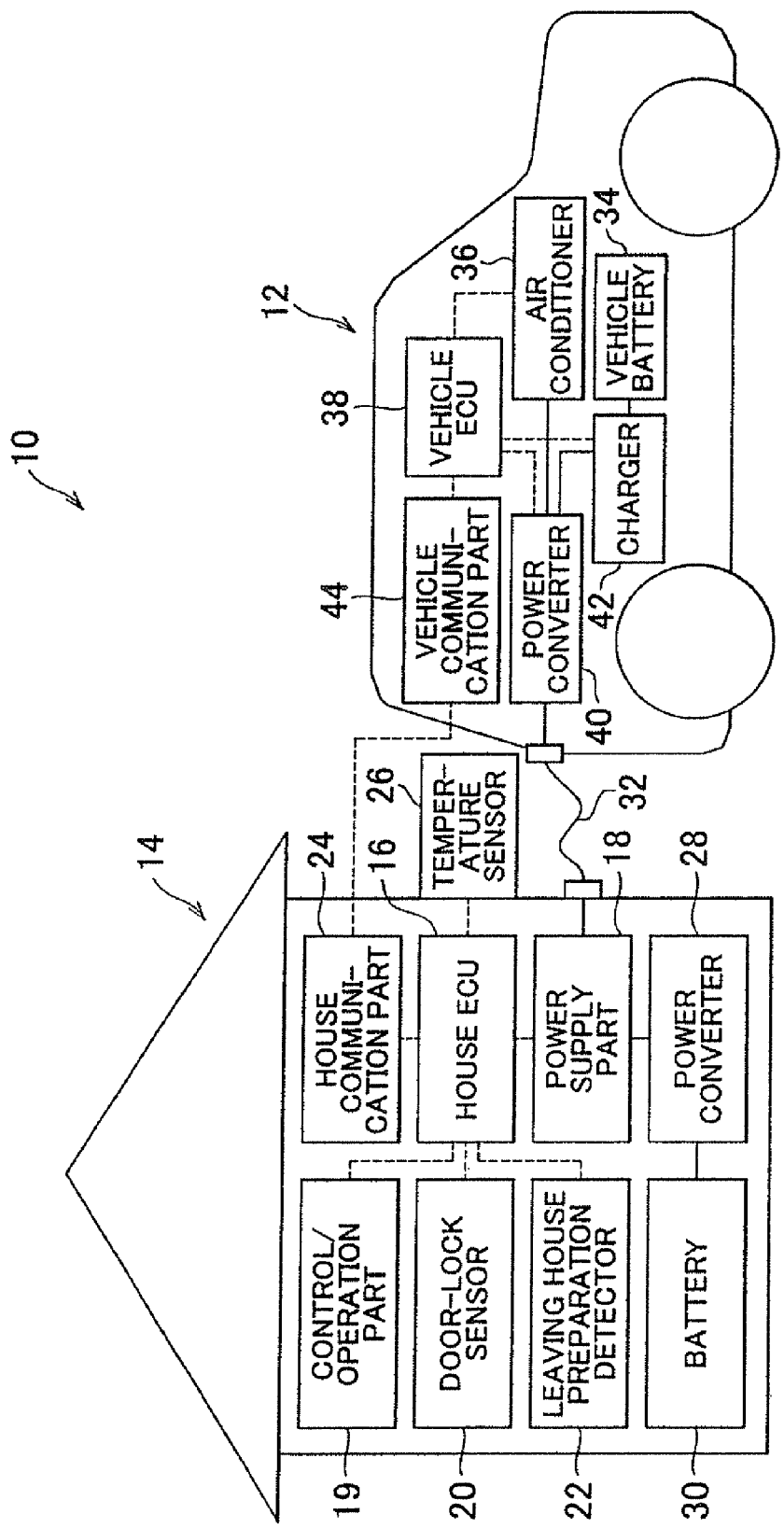
FIG. 1 is a view that illustrates the general configuration of a preliminary air conditioning system according to an embodiment of the present invention.

An example embodiment of the present invention will be described in detail below, with reference to the drawings. FIG. 1 is a view that illustrates the general configuration of a preliminary air conditioning system according to an embodiment of the present invention. In FIG. 1, the dotted lines and solid lines between components represent the flow of data and the flow of electric power, respectively.

A preliminary air conditioning system 10 according to the embodiment of the present invention supplies electric power from a building, such as a house 14, to a motor vehicle 12, such as a hybrid vehicle or electric vehicle, to charge the vehicle battery 34 mounted in the motor vehicle 12 and executes controls to preliminarily activate the air conditioner 36 of the motor vehicle 12 before a driver enters the motor vehicle 12.

The house 14 is provided with a house electric control unit (ECU) 16 that controls the supply electric power for charging the vehicle battery 34 of the motor vehicle 12 and for performing preliminary air conditioning. The house ECU 16 may be constituted by a microcomputer that includes a CPU, a ROM, a RAM, and so on.

A power supply device 18, a control/operation device 19, a door-lock sensor 20, a leaving house preparation detector 22, a house communication device 24, and a temperature sensor 26 are connected to the house ECU 16.

A power converter 28 that converts AC power into DC power is connected to the power supply device 18 so that electric power from a commercial power source can be supplied to the power converter 28 and converted from AC power into DC power by the power converter 28 to charge a battery 30 provided in the house 14. Also, the motor vehicle 12 is connectable to the power supply device 18 via a cable 32 so that the vehicle battery 34 mounted in the motor vehicle 12, i.e. a hybrid vehicle or electric vehicle, may be charged.

The control/operation device 19 is provided with an operation panel and a display, and allows the user to schedule the charging of the vehicle battery 34 when connected to the power supply device 18 and to schedule the usage period of the motor vehicle 12 (such as date and time of departure). A user may also use the control/operation device 19 to set whether to activate the air conditioner 36 of the motor vehicle 12 to perform preliminary air conditioning in which the air temperature in the cabin of the motor vehicle 12 is adjusted before entering the motor vehicle 12.

The door-lock sensor 20 detects whether a door to the house 14 is locked, and outputs the detected result to the house ECU 16. In other words, the house ECU 16 detects whether, for example, the front door is locked to determine if the resident is going to leave the house 14.

The door-lock sensor 20 may detect a preparation for locking instead of detecting locking. As means for detecting a preparation for locking, a receptacle for the key to the front door or to the motor vehicle 12 and a sensor that detects the removal of the key from the receptacle may be provided so that the removal of the key is detected by the sensor as a preparation for leaving house 14.

The leaving house preparation detector 22 detects whether the resident is preparing to go out and outputs the detection result to the house ECU 16. A sensor that detects energization of an IH heater, for example, may be used as the leaving house preparation detector based on the assumption that the resident will go out a predetermined period of time after the sensor has detected energization of the IH heater. Alternatively a sensor that detects a drop in power consumption in the house 14 to a predetermined standby level may be used to determine that the resident is preparing to leave the house 14. A sensor that instead detects an action or the like that the resident may take before leaving the house 14 may be used to detect a preparation for leaving the house to determine whether the resident is preparing to leave the house 14.

The house communication device 24 communicates with a vehicle communication device 44 provided in the motor vehicle 12. For example, the house communication device 24 may output a trigger signal that activates the air conditioner 36 when the house ECU 16 indicates that the door-lock sensor 20 or the leaving house preparation detector 22 has determined that the resident will be leaving the house 14. The house communication device 24 employ a wireless communication means such as narrow-area wireless communication (Bluetooth, for example) or wide-area wireless communication (Data Communication Module: DCM, for example), or may employ a wired communication means such as, for example, Power Line Communication: PLC. In the case of a wire communication means, the cable 32 that connects the power supply device 18 and the motor vehicle 12 may include a data communication cable.

The temperature sensor 26 detects the ambient air temperature and outputs the detected temperature to the house ECU 16, which in turn sends the detected temperature to a vehicle electric control unit (ECU) 38 via the house communication device 24 and the vehicle communication device 44. Accordingly, the vehicle ECU 38 determines whether to operate the air conditioner 36 as a heater or a cooler.

The motor vehicle 12 is equipped with the vehicle ECU 38, which controls the air conditioner 36 of the motor vehicle 12 and charging of the vehicle battery 34. The vehicle ECU 38 is constituted of a microcomputer that includes a CPU, a ROM, a RAM, and so on.

A power converter 40, a charger 42, the air conditioner 36 and the vehicle communication device 44 are connected to the vehicle ECU 38.

The power converter 40 converts the AC power supplied from the power supply device 18 of the house 14 via the cable 32 into DC power and supplies the DC power to the charger 42.

The charger 42 supplies the DC power that is supplied from the power converter 40 to the vehicle battery 34 to charge the vehicle battery 34. The vehicle ECU 38 controls the charger 42 to control the charge to the vehicle battery 34. For example, the vehicle ECU 38 controls the charging power based on the level of charge that remains in the vehicle battery 34.

The air conditioner 36 is provided with a refrigerant circulation cycle through which refrigerant is circulated to adjust the air temperature in the cabin of the motor vehicle 12. The air conditioner 36 may be provided with an electric compressor, for example, so that the air in the cabin may be cooled by circulating the refrigerant circulation cycle using the electric compressor. In addition, the air conditioner 36 may be also configured to operate as a heat pump by circulating the refrigerant in the opposite direction to warm up the cabin. Alternatively, a separate heat generator, such as an electric heater, may be provided for warming up the cabin.

When the air conditioner 36 is activated under the control of the vehicle ECU 38, the air conditioner 36 is activated as a cooler if the temperature detected by the temperature sensor 26, which is sent from the house 14 via the house communication device 24 and the vehicle communication device 44, exceeds a first threshold temperature and as a heater if it is below a second threshold temperature. While the ambient air temperature is acquired from the side of the house 14, the present invention is not limited thereto. Instead, the motor vehicle 12 may be provided with an ambient air temperature sensor, to acquire the ambient air temperature from the ambient air temperature sensor in the motor vehicle 12.

The vehicle communication device 44 can communicate with the house communication device 24 as described above, and acquires information about locking of the house 14, about preparation for leaving house and so on from the house communication device 24 and outputs the information to the vehicle ECU 38. Thus, the vehicle ECU 38 executes controls to start preliminary air conditioning based on the information that is acquired from the house communication device 24.

The charging of the vehicle battery 34 and preliminary air conditioning that are carried out in the preliminary air conditioning system 10 are described in detail below.

The preliminary air conditioning system 10 according to this embodiment controls the charging the vehicle battery 34 of the motor vehicle 12 and performance of preliminary air conditioning to preliminarily adjust the air temperature in the cabin before the use of the motor vehicle 12.

Charging of the vehicle battery 34 is controlled so that the vehicle is fully charged by a designated date and time by preliminarily setting the date and time when the motor vehicle 12 is going to be used, for example, with the control/operation device 19 (scheduled charging). For example, the house ECU 16 acquires the amount of charge in the vehicle battery 34 through communication via the house communication device 24 and the vehicle communication device 44 to calculate the required amount of charge and controls charging the vehicle battery 34 so that the vehicle battery 34 is charged when electricity is available at off-peak rates, such as during late-night hours, or so that the vehicle battery 34 is completely charged before departure by charging the battery 30 in the house 14 during off-peak hours and then charging the vehicle battery 34 from the battery 30. The battery 30 on the house 14 may be charged during the off-peak hours and the vehicle battery 34 of the motor vehicle 12 may then be charged using the electric power from the battery 30.

In the preliminary air conditioning control, the air conditioner 36 is controlled to start operate for a predetermined period of time before a designated date and time to preliminarily adjust the air temperature in the cabin by preliminarily setting a preliminary air conditioning start schedule such as the date and time when the motor vehicle 12 is going to be used with the control/operation device 19, for example. Then, the preliminary air conditioning control is executed in synchronization with the charging control. For example, the control is executed so that the charging is completed ten minutes before the scheduled departure time (i.e. the scheduled leaving house time) and the preliminary air conditioning is completed five minutes before the scheduled leaving departure time.

Other events, which do not result from operation of the control/operation device 19, may serve to trigger the preliminary air conditioning and may include the detection of locking or preparation for locking of the house by the door-lock sensor 20, the detection of preparation for leaving house by the leaving house preparation detector 22, or the detection of the elapse of a prescribed period of time after the detection of energization of the IH heater by the leaving house preparation detector 22. Other examples of trigger events for starting the preliminary air conditioning include: when an air conditioner or lamp in the house is switched off, and when the cable 32 used to charge the vehicle battery 34 is pulled out. Alternatively, a power supply detection sensor that detects, for example, energization of a kitchen appliance in the building may be provided so that preliminary air conditioning is started when the energization is detected by the power supply detection sensor.

The trigger to start the preliminary air conditioning can be selected by the control/operation device 19.

When the trigger to start the preliminary air conditioning is set, it may be set based on the number of the occupants of the house or season. For example, when only one individual occupant in the house is there, preliminary air conditioning may be set to start when the door-lock sensor 20 detects the locking. If the family consists of several individuals and all of them are going to leave the house 14, the preliminary air conditioning may be set to start when the door-lock sensor 20 detects that the door has been locked and the house ECU 16 detects that the level of power consumption in the house 14 has decreased to a predetermined standby level or lower. If the family consists of several individuals and some members will not be leaving house 14, the sensor that detects the removal of the key from the receptacle for the key to the front door or the motor vehicle 12 may be used as the leaving house preparation detector 22 so that the preliminary air conditioning can be started when the sensor detects the removal of the key. If the family has a meal before leaving the house 14, a sensor that detects energization of, for example, an IH heater used in cooking may be selected as the leaving house preparation detector 22 so that preliminary air conditioning may be started after a predetermined period of time has elapsed from when the sensor detects the use of the IH heater. In addition, the preliminary air conditioning time may be seasonally adjusted. For example, the preliminary air conditioning time in summer and winter may be set longer than that in spring and autumn.

In addition, a method of synchronizing the scheduled charging of the vehicle battery 34 and preliminary air conditioning may include measuring the amount of the current supplied from the power supply device 18 to the motor vehicle 12, determining the state of charge of the vehicle battery 34 based on the total amount of electric power supplied and the instantaneous current from the power supply device 18, and starting preliminary air conditioning once the state of charge of the vehicle battery 34 has reached a prescribed value. For example, preliminary air conditioning may be started when the start of forcible charging which is performed when the amount of charge is approximately 98% is detected based on the total amount of electric power, or started when it is determined that charging of the vehicle battery 34 is completed. If it is optimal to perform preliminary conditioning when, for example, the vehicle battery 34 is 99% charged and five minutes after the above-described forcible charging, preliminary air conditioning may be started at the time. It may be determined that forcible charging of the vehicle battery 34 has occurred when a decrease in the current value during charging is detected by the power supply device 18 or the charger 42.

In this embodiment, the total energy for scheduled charging and preliminary air conditioning may be optimized because scheduled charging and preliminary air conditioning can be performed in synchronization with each other. For example, when preliminary air conditioning is carried out after forcible charging at the end of scheduled charging is fully completed, if the preliminary air conditioning time is too long in winter, for example, the temperature of the vehicle battery 34 decreases, the vehicle battery 34 becomes inactive, and the efficiency of the vehicle battery 34 decreases. In such a case, the decrease in the efficiency of the vehicle battery 34 may be prevented by performing preliminary air conditioning concurrently with forcible charging. The calculation for the optimization as described above is performed by the house ECU 16.

If a plurality of triggers for starting preliminary air conditioning are set by the control/operation device 19, preliminary air conditioning may be started according to predetermined priorities of the triggers. For example, if a preliminary air conditioning start schedule and locking or a preparation for locking of the house are set, preliminary air conditioning based on the locking or preparation for locking of the house is assigned a higher priority than the preliminary air conditioning start schedule. The priority assigned to a particular trigger may be set by the control/operation device 19 so that preliminary air conditioning is started in accordance with the set priority of the triggers.

Next, a specific process that is executed by the preliminary air conditioning system 10 according to the embodiment of the present invention which is constituted as described above will be described. FIG. 2 is a flowchart that shows the flow of the process executed by the preliminary air conditioning system 10 according to the embodiment of the present invention.

First, in step 100, the house ECU 16 determines whether the cable 32 for use in charging is connected to the motor vehicle 12. In this determination, it is determined whether the power supply device 18 in the house 14 is connected to the power converter 40 on the motor vehicle 12 via the cable 32. If the determination is negative, the process is terminated and other processes are performed. If the determination is positive, the process proceeds to step 102. A sensor provided at the connection of the cable 32 may be used to detect the connection of the cable 32.

In step 102, the house ECU 16 determines whether the times for scheduled charging and preliminary air conditioning have been set. Specifically, it is determined whether the control/operation device 19 has been operated to set the time for performing scheduled charging and preliminary air conditioning. If the determination is negative, the process proceeds to step 104. If the determination is positive, the process proceeds to step 106.

In step 104, even though scheduled charging and preliminary air conditioning are not performed, electric power is still supplied from the power supply device 18 to the power converter 40 of the motor vehicle 12 via the cable 32 and converted into DC power, which is directly used to charge the vehicle battery 34 by the charger 42. In this embodiment, the vehicle battery 34 is immediately charged if the determination in step 102 is negative. However, when if the control/operation device 19 has been operated to preliminarily set only scheduled charging, the process of charging the vehicle battery may be performed according to the schedule. If only preliminary air conditioning is preliminarily set, preliminary air conditioning may be performed according to the set schedule.

In contrast, in step 106, the departure time is set. Then, the process proceeds to step 108. Specifically, the departure time is set by operating the control/operation device 19. While setting the departure time, the user may also use the control/operation device 19 to set the charging of the vehicle battery 34 other than the departure time or to adjust the preliminary air conditioning settings (such as settings about whether or not to start preliminary air conditioning using a trigger other than the schedule (preliminary air conditioning start time that is obtained from the set departure time) in step 122, which is described later).

In step 108, the charging time and preliminary air conditioning time are calculated. Then, the process proceeds to step 110. In the calculation of charging time and preliminary air conditioning time, the charging time is calculated by acquiring the level of charge remaining in the vehicle battery 34 from the vehicle ECU 38 and then calculating the amount of electric power needed to charge the vehicle battery 34. The preliminary air conditioning time is calculated by determining the amount of time needed to have the air in the cabin reach a predetermined comfortable temperature based on the initial temperature in the cabin or the ambient air temperature acquired from the vehicle ECU 38. The ambient air temperature may be acquired from the temperature sensor 26.

In step 110, charging time and preliminary air conditioning time are set. Then, the process proceeds to step 112. That is, charging start time and preliminary air conditioning start time are set based on the departure time, charging time, and air-conditioning time so that the charging can be completed and the air in the cabin can reach a comfortable temperature by the time of departure.

In step 112, the current time is acquired. Then, the process proceeds to step 114. The current time is measured by the house ECU 16, for example, and acquired by reading the current time.

In step 114, the house ECU 16 determines whether the charging start time has come. If the determination is negative, the process returns to step 112 and the above procedure is repeated. If the determination is positive, the process proceeds to step 116.

In step 116, the supply of electric power from the power supply device 18 started to be supplied to the power converter 40 of the motor vehicle 12 to charge the vehicle battery 34. That is, the AC power is supplied from the power supply device 18 of the house 14 and converted into DC power by the power converter 40, and the DC power is in turn supplied to the charger 42 and used to charge the vehicle battery 34.

In step 118, the amount of charge is read. Then, the process proceeds to step 120. The charger 42 may read the amount of charge by monitoring the state of the vehicle battery 34 (voltage or current value, for example) while charging, or a sensor may be provided to monitor the current or voltage.

In step 120, it is determined whether there is sufficient electric power to perform preliminary air conditioning. Specifically, it is determined whether or not the amount of charge in the vehicle battery 34 has reached a predetermined value that is necessary to perform preliminary air conditioning, or the amount of electric power that is necessary for preliminary air conditioning, which can be calculated from the preliminary air conditioning time, is calculated to determine whether or not the amount of charge in the vehicle battery 34 has reached the calculated amount of electric power. If the determination is negative, the process returns to step 118 and the above procedure is repeated. If the determination is positive, the process proceeds to step 122.

In step 122, the house ECU 16 determines whether a preliminary air conditioning start setting other than the schedule has been made. In this determination, it is determined whether the control/operation device 19 has been operated to set a preliminarily air conditioning start time using a trigger other than the preliminary air conditioning start time that is based on the set departure time. If the determination is negative, the process proceeds to step 124. If the determination is positive, the process proceeds to step 126.

In step 124, the house ECU 16 determines whether it is time to start the preliminary air conditioning. In this determination, it is determined whether the current time is equal to the preliminary air conditioning time scheduled in step 110. The system waits until the determination becomes positive. When the preliminary air conditioning time comes, the process proceeds to step 128.

In contrast, in step 126, the house ECU 16 determines whether a preliminary conditioning starting trigger has occurred. In this determination, it is determined whether the door-lock sensor 20 has detected locking of the front door or the like, or the leaving house preparation detector 22 has detected a preparation for leaving house or preparation for locking. The system waits until the determination becomes positive. When the determination is positive, the process proceeds to step 128. The determination on whether a preliminary air conditioning starting trigger has occurred may be made by preliminarily setting one of a plurality of triggers to start preliminary air conditioning other than the schedule in the control/operation device 19 and determining whether the set trigger has been output, or by providing a plurality of settable triggers other than the schedule and determining whether any of the triggers has been output.

In step 128, preliminary air conditioning is started and the process is ended. That is, the house ECU 16 instructs the vehicle ECU 38 to start the air conditioner 36 via the house communication device 24 and the vehicle communication device 44, whereby the vehicle ECU 38 controls the air conditioner 36 to adjust the air temperature in the cabin. As a result, the air in the cabin can be preliminarily adjusted to a comfortable temperature before the motor vehicle 12 is driven.

As described above, in the preliminary air conditioning system 10 according to this embodiment, when the cable 32 connects the motor vehicle 12 with the house 14, a charging schedule may be determined and charging is controlled according to the schedule. Specifically, as shown in FIG. 3, scheduled charging is started at the charging start time, and the charging is completed after forcible charging which is performed when the level of charge reaches a prescribed value (98% or 99%, for example). If preliminary air conditioning is also performed according to schedule, the preliminary air conditioning is started when the forcible charging is started or when the charging is completed. In this way, preliminary air conditioning can be performed to make the cabin comfortable before the motor vehicle 12 is driven.

However, if preliminary air conditioning is performed at the scheduled time, the preliminary air conditioning time may be long if the resident may drive the motor vehicle after the scheduled time or the resident may drive the motor vehicle before preliminary air conditioning is started if the resident may drive the motor vehicle before the scheduled time.

Thus, in this embodiment, preliminary air conditioning can be started using a trigger other than the scheduled start time. That is, as shown in FIG. 3, preliminary air conditioning is started when locking or when a preparation for leaving house is detected. In this way, it is possible to complete charging and preliminary air conditioning shortly before the departure time and ensure that preliminary air conditioning is performed to make the cabin comfortable before the motor vehicle is driven.

In addition, in this embodiment, the determination in step 120 stays negative to prevent the process from proceeding to the subsequent steps and therefore start preliminary air conditioning is inhibited until the amount of charge in the vehicle battery 34 reaches a prescribed value. In other words, because preliminary air conditioning is started after the amount of charge in the vehicle battery 34 has reached the prescribed value, it is possible to avoid a situation where the amount of charge is insufficient to start preliminary air conditioning. Thus, preliminary air conditioning may be reliably performed.

In this embodiment, the determination of whether the charging start time has come is made earlier as shown in the flowchart of FIG. 2, because charging usually takes more time than preliminary air conditioning. However, the determination whether the amount of electric power has reached a level that is necessary for preliminary air conditioning and whether the scheduled preliminary air conditioning start time has come may be determined earlier, because the vehicle battery may be sufficiently charged to allow preliminary air conditioning when the amount of electric power remaining in the vehicle battery 34 at the end of the resident's previous trip is higher than expected.

What is claimed is:

1. A preliminary air conditioning system, comprising:
a communication device that communicates with a motor vehicle that is equipped with an air conditioner that has a preliminary air conditioning function of controlling the temperature in the cabin of the motor vehicle before the motor vehicle is driven and a battery that stores electric power used by the motor vehicle;
a charger that determines the state of charge of the battery based on the communication by the communication device and supplies electric power that is necessary to charge the battery to the motor vehicle from a building to charge the battery;
a detector that detects a transition or a preparation for a transition from an unlocked state to a locked state of a door of the building, or a transition or preparation for a transition from a locked state to an unlocked state of a door of the building; and
a controller that is configured to control the air conditioner to activate the preliminary air conditioning function using the communication by the communication device based on the result of detection by the detector when the communication device indicates that the detector has detected the locking or preparation for locking.

2. The preliminary air conditioning system according to claim 1, further comprising:
a setting device that is provided in the building and that is operated by a user to set a schedule for activating the preliminary air conditioning function,
wherein the setting device selectively sets a trigger to activate the preliminary air conditioning function based on the activation schedule or on the result of detection by the detector, and
wherein the controller further controls the air conditioner to activate the preliminary air conditioning function based on the trigger that is set by the setting device.

3. The preliminary air conditioning system according to claim 1, further comprising:
a temperature detector that is provided in the motor vehicle or the building to detect the ambient air temperature,
wherein the controller further controls the air conditioner to make it function as a cooler if the detected ambient air temperature exceeds a first prescribed temperature and to make it function as a heater if the detected ambient air temperature is below a second prescribed temperature.

4. The preliminary air conditioning system according to claim 1, further comprising:
an energization detector that detects energization of a kitchen appliance in the building,
wherein the controller further controls the air conditioner to activate the preliminary air conditioning function based on the result of detection by the energization detector when the energization is detected.

5. The preliminary air conditioning system according to claim 1, further comprising:
a leaving house preparation detector that detects a preparation for leaving house by a resident of the building,
wherein the controller further controls the air conditioner to activate the preliminary air conditioning function if the leaving house preparation detector detects the preparation for leaving house.

6. The preliminary air conditioning system according to claim 5,
wherein the leaving house preparation detector determines that a preparation for leaving house is detected when a prescribed period of time has passed after energization of an IH heater is detected.

7. The preliminary air conditioning system according to claim 5,
wherein the leaving house preparation detector determines that a preparation for leaving house is detected when a prescribed period of time has passed after an air conditioner in the building is switched off.

8. The preliminary air conditioning system according to claim 5,
wherein the leaving house preparation detector determines that a preparation for leaving house is detected when a prescribed period of time has passed after a lamp in the building is switched off.

9. The preliminary air conditioning system according to claim 5,
wherein the leaving house preparation detector determines that a preparation for leaving house is detected when a prescribed period of time has passed after a cable used to charge the battery is pulled out.

10. The preliminary air conditioning system according to claim 2,
wherein the setting device sets predetermined priorities to a plurality of triggers, and the controller activates the preliminary air conditioning function of the air conditioner according to the priorities of the triggers.

11. The preliminary air conditioning system according to claim 1,
wherein the controller inhibits the activation of the preliminary air conditioning function before the amount of charge in the battery reaches a prescribed value.

* * * * *